Oct. 12, 1965  M. A. MITTLER ETAL  3,212,049
MULTILAYER CIRCUITRY WITH PLACED BUSHINGS
Filed April 30, 1963  5 Sheets-Sheet 1

INVENTORS
MARTIN A. MITTLER
SEYMOUR OFFERMAN
BY ROBERT B. PITTMAN
RICHARD A. ROSENBERG

James and Franklin
ATTORNEYS

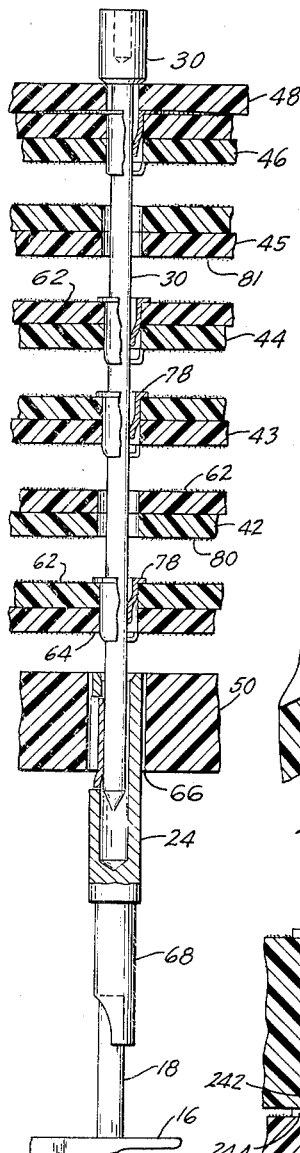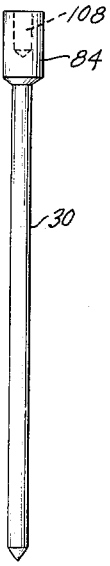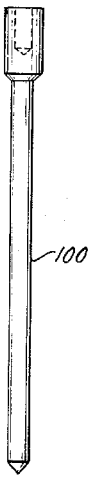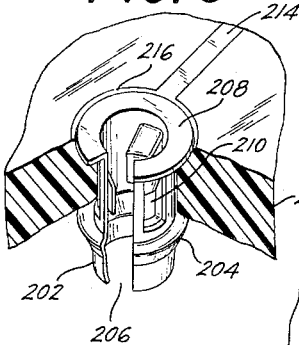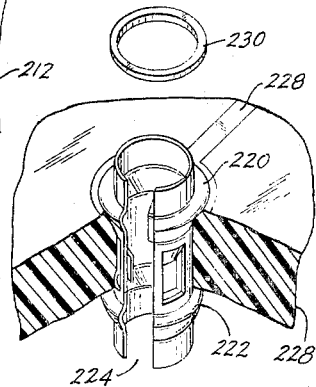

INVENTORS
MARTIN A. MITTLER
SEYMOUR OFFERMAN
ROBERT B. PITTMAN
RICHARD A. ROSENBERG
BY
James and Franklin
ATTORNEYS

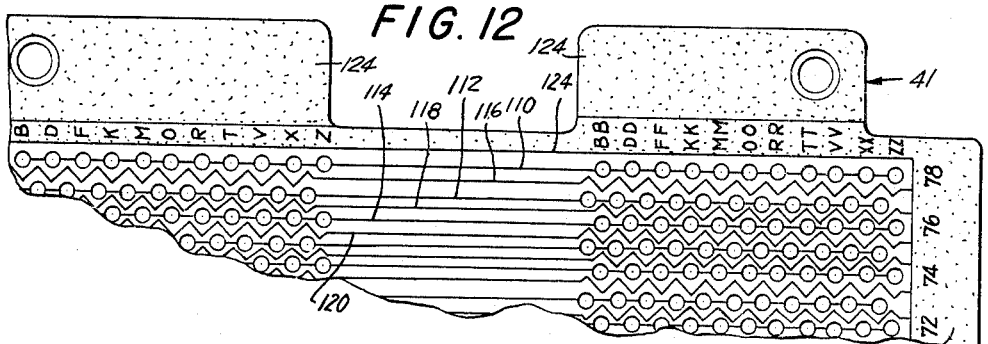
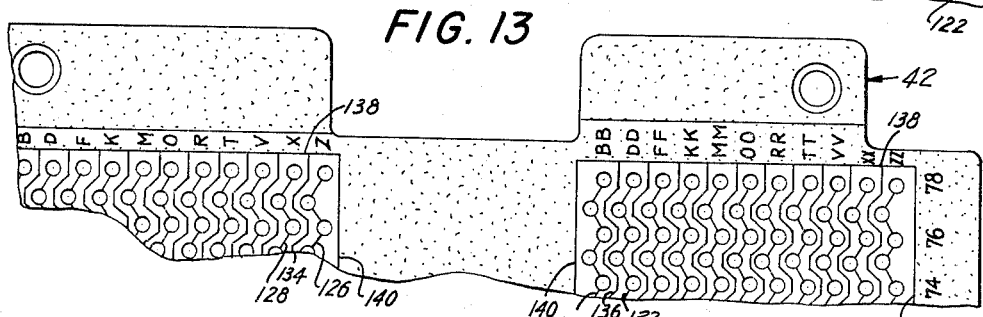
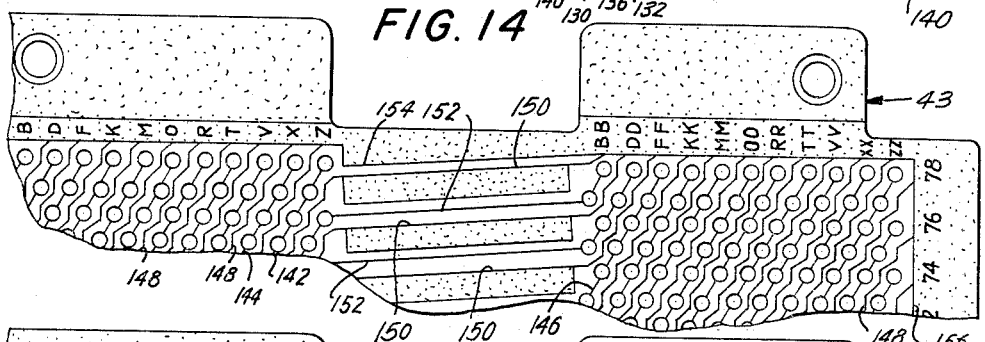
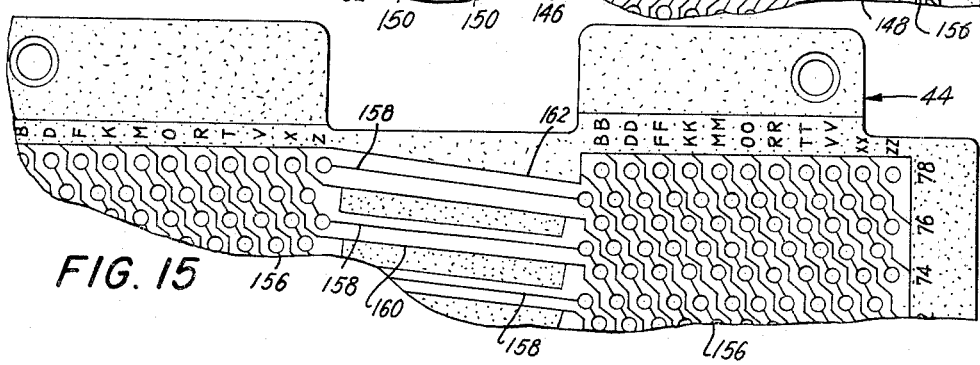

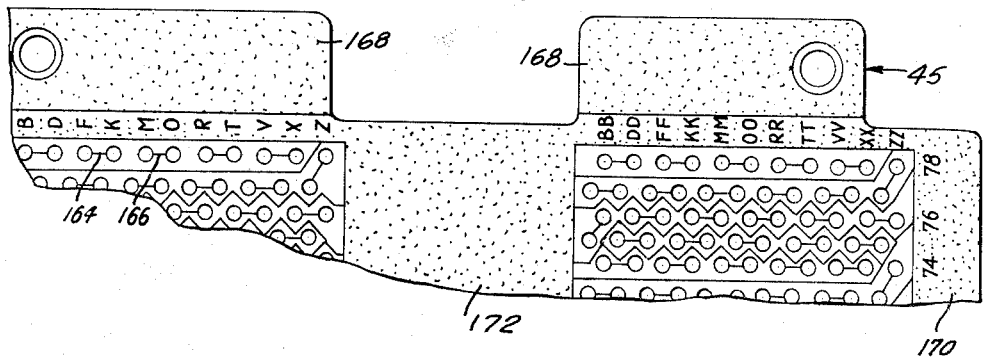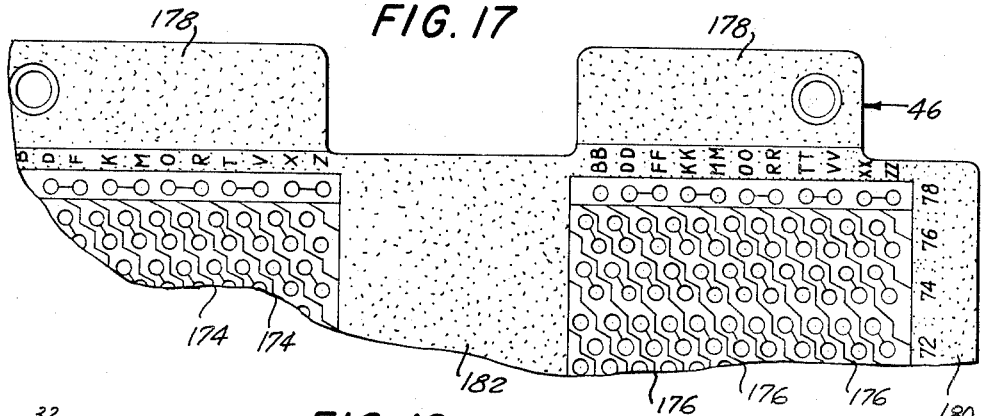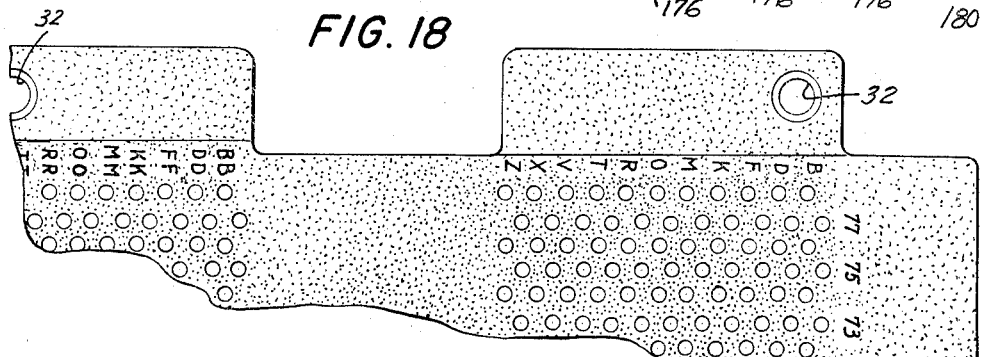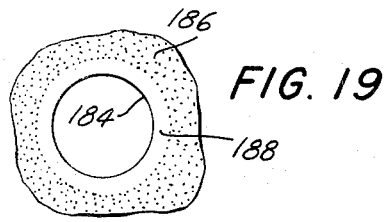

United States Patent Office 3,212,049
Patented Oct. 12, 1965

3,212,049
MULTILAYER CIRCUITRY WITH PLACED BUSHINGS
Martin A. Mittler, Flushing, and Seymour Offerman, New York, N.Y., and Robert B. Pittman, River Edge, and Richard A. Rosenberg, Dumont, N.J., assignors to Industrial Electronic Hardware Corp., New York, N.Y., a corporation of New York
Filed Apr. 30, 1963, Ser. No. 276,796
2 Claims. (Cl. 339—18)

This invention relates to complex back panel wiring, and more particularly to multiple layer printed circuitry for accomplishing such wiring, especially but not necessarily for computer racks.

Computers have racks which slidably receive interchangeable printed circuit boards, sometimes called "mother boards." These are detachably received in edgeboard connectors at the back, and the contacts of the connectors have lugs for numerous wire connections located behind the rack. This wiring is painstaking and expensive to do, and an error is easy to make, and difficult to locate and correct.

In our copending application, Ser. No. 168,791, filed January 25, 1962 and now Patent No. 3,179,913, and entitled "Multilayer Circuitry" we disclose the use of multiple printed circuit boards which are coextensive with the connectors at the back of the rack, and which receive pins pushed through aligned holes in the boards to connect the circuit lines of different boards to each other and/or to an edgeboard connector. Unless the back panel wiring is to be duplicated in large quantity it would not pay to make specially printed circuit boards, and instead the desired wiring is obtained by means of standardized matrix boards.

The holes in the boards are provided wtih bushings having inwardly directed resilient tongues to insure good contact with a pin driven therethrough. The bushing is permanently connected to its adjacent printed line, as by soldering. In our copending application all of the holes in the boards are provided with bushings. To avoid contact where none is wanted, the metal pin has an insulation band at a bushing. Different combinations of metal and insulation along a single pin are needed, and accordingly a very large variety of pins were needed and provided.

The primary object of the present invention is to provide multilayer circuitry of a different type. The present system employs simple metal pins with no insulation bands, and no variety of pins is required. For an open circuit at a particular board the spring contact bushing is omitted. The hole in the board is substantially larger than the pin, and thus contact is avoided. In this system, unlike that in our aforesaid copending application, the sets of matrix boards are not all alike when finished. They are alike in respect to the overall perforations, and in respect to the printed lines, which may be vertical on one board, horizontal on another, diagonal on another, etc. However, the present system differs at the time of insertion of the bushings in that the bushings are selectively inserted or placed, instead of being inserted in every hole. There is some saving in the cost of bushings, and a bigger saving in the cost of manufacture of many different complex pins. In the present system the pins are plain metal pins.

To accomplish the foregoing general object, and other more specific objects which will hereinafter appear, our invention resides in the multilayer circuitry elements and their relation one to another, as are hereinafter more particularly described in the following specification. The specification is accompanied by drawings, in which:

FIG. 5 is a section at one of the connection pins passing through the boards;

FIG. 6 is an elevation of a pin;

FIG. 7 is a similar view showing a shortened pin which is used when connection with a terminal is not wanted;

FIG. 8 is a partially sectioned perspective view showing a modified bushing used in a single layer matrix board;

FIG. 9 is a similar view showing another bushing;

FIG. 10 is a similar view showing how short bushings may be employed in matrix boards which are to be superposed without spacing therebetween;

FIG. 12 is a fragmentary view corresponding to the right end of the board shown in FIG. 11, printed to act as a matrix board with vertical circuit lines;

FIG. 13 is a fragmentary view corresponding to the right end of FIG. 11, printed to act as a matrix board with horizontal circuit lines;

FIG. 14 is a fragmentary view corresponding to the right end of FIG. 11, printed to act as a matrix board with diagonal circuit lines;

FIG. 15 is a fragmentary view corresponding to the right end of FIG. 11, printed to act as a matrix board with diagonal lines sloping in opposite direction;

FIG. 16 is a fragmentary view corresponding to the right end of FIG. 11, printed to act as a matrix board with interrupted vertical lines:

FIG. 17 is a fragmentary view corresponding to the right end of FIG. 11, printed to act as a matrix board with interrupted transverse lines;

FIG. 18 is a fragmentary view corresponding to the right end of FIG. 11, but inverted, and with the board printed to act as a shield; and FIG. 19 is a fragmentary view drawn to enlarged scale at one of the holes in FIG. 18.

Figure 1:
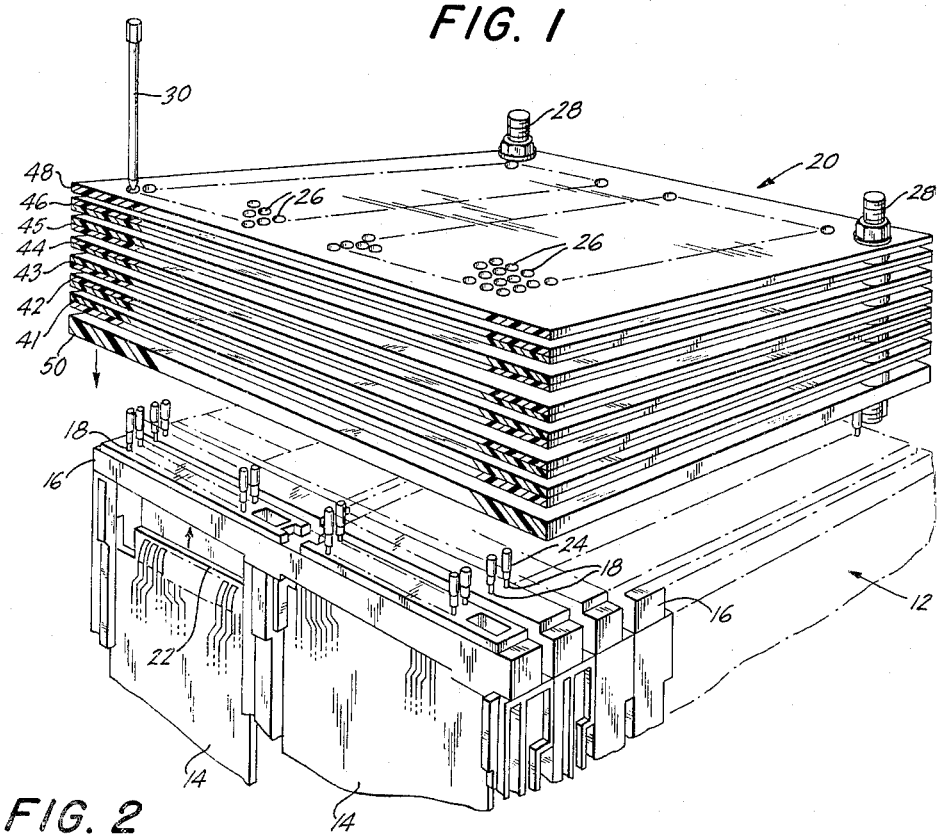
FIG. 1 is a perspective fragmentary view showing matrix boards separated from the back of a rack, with one of the pins about to be inserted through the boards.

Referring to the drawing, and more particularly to FIG. 1, the computer rack generally designated 12 has guide grooves for the slidable reception of printed circuit boards 14 called "mother boards." The upper edges of the boards are received in edgeboard connectors located at 16. The connectors have a terminal for each contact, resulting in an array of a large number of terminals, a few of which are indicated at 18. In one specific case there are 880 such terminals, which usually are interconnected by insulated wire leads, requiring lengthy and painstaking work.

In accordance with our prior and present inventions, this back panel wiring is replaced by a multilayer matrix indicated generally at 20, the matrix boards being coextensive in area with the array of edgeboard connectors 16, and being disposed perpendicular to the mother boards 14.

In FIG. 1, the matrix boards are shown disposed over but separated from the back of the rack, the latter having been turned face down so that the mother boards 14 are upright, with their then upper edges received in the edgeboard connectors 16. One mother board has been slid down somewhat to show its edge 22. The connectors 16 may be conventional, except that female rather than male terminals are wanted, and in this case male terminals have been converted to female terminals at 24. Only a few of the terminals are shown, but it will be understood that the connectors are filled with terminals.

The matrix boards 20 have a large number of holes, a few of which are indicated at 26, and in the present case about half of these are located in alignment with the terminals 24. All of the holes in each board are in alignment with the corresponding holes in all of the other boards, and the boards are held in registration as by means of spacers and bolts, two of which are indicated at 28. There are also grounding bolts, not shown, which pass through the matrix boards and into the rear frame of the rack, and these act as ground connections for matrix shielding which is described later. The grounding bolts and spacer bolts are described in full detail in our said application Serial No. 168,791.

The circuitry is completed by pins, one of which is indicated at 30, and which are dimensioned to pass through the aligned holes, and which in many but not all cases are received in the female terminals 24 to provide electrical connection between the terminals and printed lines on the matrix boards. Additional rows of holes located between the rows of terminals 24 make possible additional connections between matrix boards.

Figure 11:
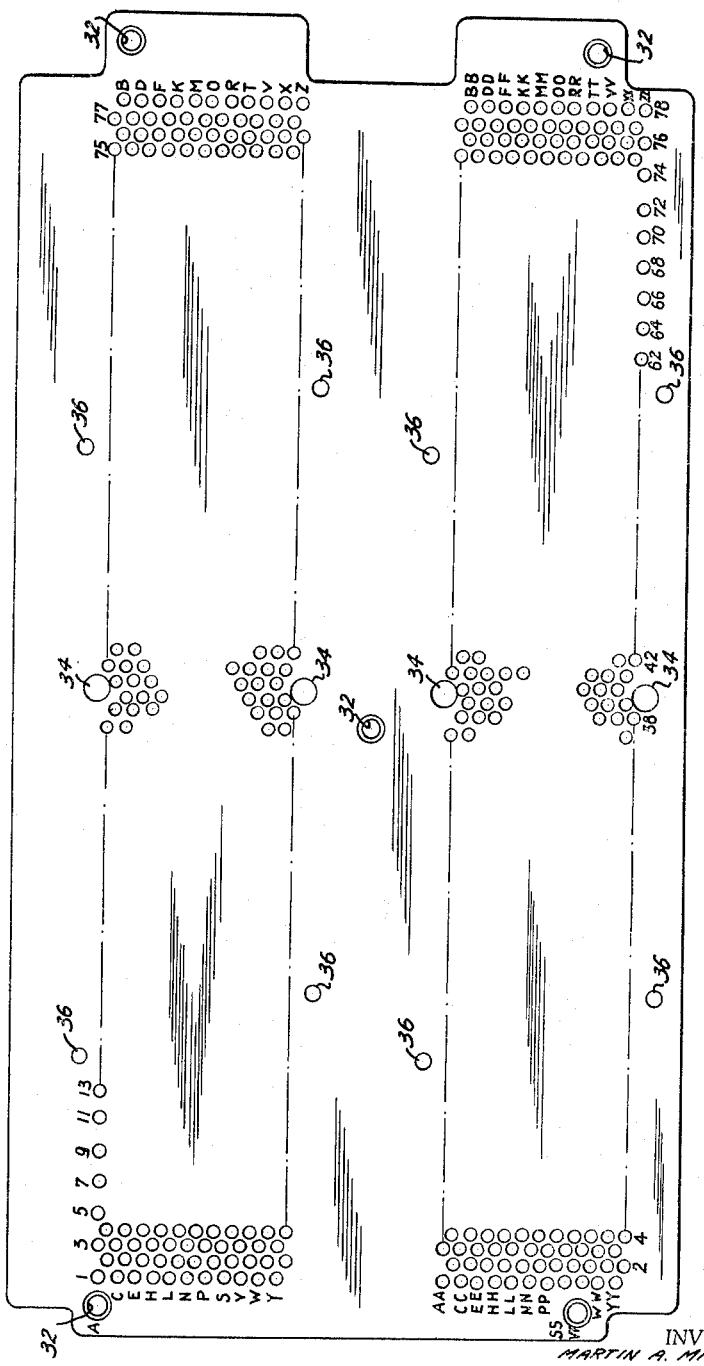
FIG. 11 is a plan view of an insulation board showing some of the complete array of holes used in the matrix boards.

FIG. 11 shows a typical insulation board with perforations therethrough, it being understood that perforations are completed all the way across the board between those shown. The completion of the holes in the matrix board is indicated by the broken lines, the area between the upper two broken lines being filled with holes, and similar remark applies to the lower two broken lines. The holes are somewhat staggered or offset, to match the terminals of the edgeboard connectors. This pattern of holes is the same for all of the boards, although the printed circuit lines on the boards differ.

It will be noted that for identification or coding, the holes are lettered from A through Z in vertical direction, with alternate letters on one end, and the intermediate letters at the other end of the board. The lower array is distinguished from the upper by the use of double letters "AA," "BB," etc. instead of "A," "B," etc. In horizontal direction the holes are numbered 1–78, with alternate or odd numbers at the top, and the intermediate or even numbers at the bottom.

While referring to FIG. 11, it may be pointed out that the four end holes and one center hole marked 32 receive the spacer bolts 28 referred to in FIG. 1. The four middle holes marketd 34 are clearance holes for four main bus wire connections. The holes marked 36 receive grounding bolts previously mentioned.

Reverting to FIG. 1, in the present case there are six matrix boards marked 41 through 46. There is also a thicker base plate 50, and a thin insulation cover board 48, which have no printed circuitry. The matrix boards 41–46 are printed with different lines or grids, and in the particular case here shown, the board 41 has vertical lines; the board 42 has horizontal lines; the board 43 has diagonal lines; the board 44 has diagonal lines of opposite slope; the board 45 has interrupted vertical lines or dashes; and the board 46 has interrupted transverse lines or dashes. Moreover, the opposite face of each matrix board, in this case the upper face, is coated with a metallic shield surface or coating, and the grid side of the board has another grid of grounded shielded lines alternating between the circuit lines, as is described later. In most cases the grid of shield lines is sufficient, without the back or surface shielding.

The relationship of a connector pin to the contact boards is illustrated in FIG. 5, referring to which the pin 30 is pushed through the boards 48, 46, 45, 44, etc., and then into a female terminal 24 of an edgeboard connector 16. The upper end portion of terminal 24 is received in a mating hole 66 of the base plate 50, and it will be understood that there are similar holes properly located for all such terminals.

Figure 4:
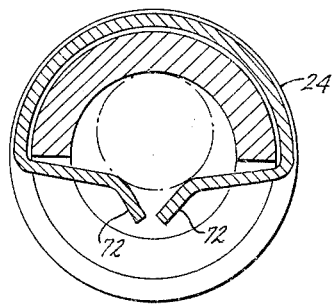
FIG. 4 is a transverse section taken through the upper portion of a closed entry contact described later.

In the particular structure here illustrated, the edgeboard connectors 16 had male terminals 18, and the parts 24 were added to convert them to female terminals. The part 24 is shown in greater detail in FIG. 4 of the drawing, referring to which the upper end is hollowed or cut away at one side to receive a spring element 72 which provides resilient contact. The top end is not cut away and remains a complete circle.

Some of the holes in the matrix boards have bushings to insure good electrical contact with a pin 30 passed therethrough. A bushing is drawn to large scale in FIGS. 2 and 3, referring to which there is a sleeve portion 76 the upper end of which is flanged outward at 78. There are a plurality, in this case three tongues 80, struck inward to bear resiliently against the pin. This bushing is secured in the matrix board by soldering at its lower end to a printed line passing therethrough, the bushing being held by its flange on top and by the solder at the bottom. The printed lines are circular around each hole, and therefore are not interrupted by the holes.

The bushing does not contact the shielding at the top because the latter terminates short of the flange, as shown at 62 in FIG. 5 and at 188 in FIG. 19. However, when the lines 64 on the bottom surface are deposited they come to the hole, and preferably there is a ring of deposit around the hole. The soldering operation may be done by dip soldering or by dropping a mating ring of solder around the end of each bushing, and then subjecting the entire board to heat.

Figure 2:
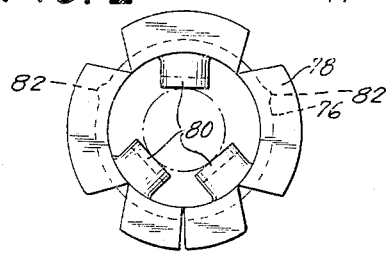
FIG. 2 is a plan view of a bushing forming a part of the invention.
Figure 3:
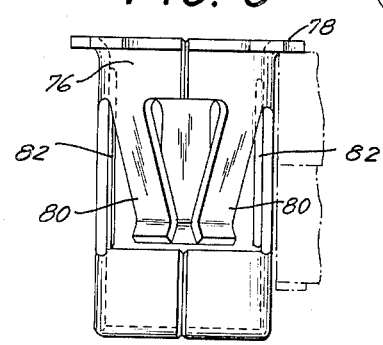
FIG. 3 is an elevation of the same.

To help hold the bushings in the board until soldered, a somewhat frictional fit may be provided, as by striking several longitudinal beads outwardly, as indicated at 82 in FIGS. 2 and 3. The tongues 80 are shorter than the thickness of the matrix board, and are not subjected to solder.

The bushings preferably are made of beryllium copper, and may be heat treated to give the tongues the desired resilience. Similar remark applies to the spring 72 in FIG. 4.

In FIG. 5 it is important to note that although the boards 41, 43, 44 and 46 have bushings, the boards 42 and 45 do not. The holes through the boards are substantially larger than the diameter of the pin 30, and therefore an effective open circuit is provided as between the pin and the printed line 80 on board 42 and the printed line 81 on board 45.

It will be understood that the insertion or omission of a bushing is planned in advance, and is prescribed in accordance with the alpha-numeric code previously described. In some cases a large number of bushings may be omitted. All of the boards are alike in respect to the perforations. If it be assumed that matrix board 41 has vertical lines, the corresponding matrix board (vertical lines) in other assemblies may be printed and perforated identically the same way, but may differ extensively in the use of bushings. All boards 41 with vertical lines may be alike in respect to the printing of metal lines thereon, and the same applies to the boards 42 with horizontal lines, the boards 43 with diagonal lines, etc. But thereafter in the course of manufacture the boards differ because of the different placement of bushings.

The pin 30 is shown separately in FIG. 6. It is made of metal, and the shank is of uniform diameter throughout its length. It preferably has a head 84 to limit insertion of the pin, and the head may have a hole 108 which makes possible additional back panel wiring by use of ordinary insulated wires in case the desired circuitry is not fully completed by means of the matrix boards.

In many cases a connection is to be made between one matrix board and another, but not to an edgeboard connector. A simple way to accomplish this is to provide shorter pins, indicated at 100 in FIG. 7. Such a pin does not reach the board 50 and the female terminal 24 shown at the bottom of FIG. 5.

Referring to FIG. 8 the bushing 202 differs from that previously described in having a bead 204 and an open side at 206 which affords circumferential and radial contraction of the bushing, for insertion into a hole with a snap fit. The insertion is limited by a flange 208. As before the body of the bushing has inwardly struck tongues 210 for good contact with the pin.

Another difference shown in FIG. 8 is that the matrix board 212 is of single thickness, and has no shielding on the back. It has its printed lines 214 on top. At each hole the line becomes an annular band 216 around the hole. The flange 208 bears against the ring 216, and the electrical contact is additionally improved by soldering which may be done by dip soldering, or by use of solder rings and heat.

Still another form of bushing is shown in FIG. 9. In this case there is an annular bead 220 at the upper end in addition to the bead 222 at the lower end. Here again the side of the bushing is open at 224 to facilitate contraction when the bushing is pushed into position. The board 226 again is a single board with printed lines 228 on one side, the opposite face of the board being bare. A solder ring 230 is dropped in position on each bushing, and the board is passed through an oven to melt the rings.

As so far described, the superposed boards are spaced apart by means of suitable spacers. This is true of the double or laminated boards shown in FIGS. 1 and 5, and also of the single boards shown in FIGS. 8 and 9. However, when dispensing with overall shielding on back of the board, it is possible to superpose the boards in face-to-face relation with no spacers therebetween. In such case, however, it is necessary that the bushing be shortened, so that it stops safely within the surface of the board. Such an arrangement is shown in FIG. 10 in which there are upper and lower boards 234 and 236. Board 234 is printed on its top face as indicated at 238, and the same applies to board 236. The bushing 240 therefore has its flange on top for connection to the line 238. Its lower end 242 stops within or above the bottom face of the board 234 and therefore does not contact the printed lines nor the top flange 244 of the bushing 246 in the lower board 236. In the case illustrated, there will be a connection between bushings 240 and 246 when a pin is inserted. If no connection were wanted, one bushing or the other would be omitted.

The short bushing of FIG. 10 may be used with spacers, if desired, and in such case the spacing may be reduced to a small amount.

Referring now to FIG. 12, the part there shown corresponds to the right end of FIG. 11 and illustrates the provision of vertical lines. The lines are called vertical because that would be their position when looking at the complete board as in FIG. 11 in which the long dimension of the board is considered to be horizontal.

In FIG. 12 the holes numbered "78" as printed permanently on the board, are connected by a vertical printed circuit line 110 shown running from hole to hole across the drawing. The holes numbered "77" as printed on the board (the number 77 does not show in FIG. 12, it being on the cut away top portion of the board, but it does show in FIG. 11) are connected by a vertical printed circuit line 112. The holes numbered "76" are connected by a vertical printed circuit line 114.

These circuit lines are isolated or shielded by intermediate printed lines indicated at 116, 118, 120 etc. These shield lines are given a somewhat zig-zag formation because the holes themselves are in staggered relation. The vertical shield lines may be made straight when there is greater spacing between holes. The shield lines 116, 118 etc. are all grounded, and for this purpose they are connected at their ends to horizontal metal areas 122 which in turn are connected by vertical areas 124. The areas 122 and 124 form a rectangular peripheral frame extending outward to the edge of the board, and at suitable points this frame includes the holes for the grounding bolts previously mentioned. The shield lines 116, 118, 120 etc. form a shield grid within the peripheral frame area.

FIG. 13 is a similar view but shows a matrix board having horizontal lines. In this case, the lines are somewhat zig-zag because of the staggered relation of the holes. The holes marked "Z" on the board are connected by a horizontal line 126; the holes marked "X" are connected by a horizontal line 128; the holes marked "BB" by a horizontal line 130; the holes marked "DD" by a horizontal line 132, and so on.

The horizontal circuit lines are shielded by additional printed lines located between the circuit lines. Thus there is a shield line 134 between horizontal lines 126 and 128, and a shield line 136 between horizontal lines 130 and 132. The shield lines terminate at their ends in vertical ground areas at 138, in turn connected to horizontal ground areas at 140. The ground areas extend out to the edge of the board, and include the grounding bolts.

Referring now to FIG. 14, there are printed diagonal circuit lines. The circuit line beginning at the hole marked "Z" on the board is shown at 142. The diagonal line beginning at the hole marked "X" is shown at 144. The diagonal line beginning at the hole marked "FF" is shown at 146.

As before, there are shield lines between the circuit lines, these shield lines being indicated at 148. Shield lines in each half of the board may be connected to one another as indicated by the lines 150. These may be widened into areas. The circuit lines also are connected, as indicated at 152.

There are peripheral grounding areas, indicated here at 154 and 156. These extend in a closed circuit entirely around the board, and are connected to the grounding bolts.

FIG. 15 shows a matrix board like that shown in FIG. 14, except that the diagonal lines slope in opposite direction. The holes are connected by printed circuit lines such as 156, and the circuit lines of the upper and lower banks may be connected as indicated at 158. Shielding lines are disposed between the circuit lines, and are connected to one another as indicated at 160. They are also connected to peripheral grounding areas at 162 which extend around the board and which receive the shield lines to form a shield grid. The shielding areas are connected to the grounding bolts previously mentioned.

Referring now to FIG. 16, this matrix board has interrupted vertical lines or dashes. The short vertical line or dash 164 connects holes "F–78" and "K–78." The line or dash 166 connects holes "M–78" and "O–78." There is no connection between holes "K–78" and "M–78."

Shield lines are provided between the dash lines, and these shield lines sometimes may be straight and sometimes zig-zag, depending on the spacing between the rows of holes. The peripheral areas 168 and 170, and the middle area 172, are coated with shielding metal. The grid shield lines are connected to metal areas, which are grounded by ground bolts.

FIG. 17 shows the last matrix board with its dash lines. What is wanted are dashes extending in a direction transverse to the vertical dashes provided by the matrix board shown in FIG. 16. Ordinarily therefore the matrix board 46 would have horizontal dashes. However, it will be recalled from FIG. 13 that the horizontal lines are zig-zag rather than straight, and thus the horizontal dashes look diagonal in this particular case. Inasmuch as the dashes of board 46 might equally well be called horizontal or diagonal, a more generic term, "transverse" is here used, meaning transverse to the vertical dashes of matrix board 45. Some residual holes may be connected by vertical dashes, as shown at the row of holes marked "78." These are offset relative to the vertical dashes of FIG. 16.

As before, the circuit lines or dashes are shielded by shield lines, which in this case extend diagonally and are somewhat zig-zag, as shown at 174 and 176. The shield lines extend to and are connected by peripheral shield areas 178, 180, and a middle shield area 182. The shield lines form a shield grid which is connected to the shield areas, and these in turn are grounded by grounding bolts.

FIG. 18 shows the overall surface shielding which may be provided on the opposite face of each of the matrix boards. It is found convenient to apply metal to only one face of a circuit board, and therefore in the present structure each matrix board comprises two layers of insulation. The bottom face of the lower board is printed with matrix lines as shown in FIGS. 12–17. The top face of the upper board is printed with the surface shielding illustrated in FIG. 18. The code letters in FIG. 18 appear in reverse relation, because the laminations are secured back to back.

The metal coating in FIG. 18 is nearly an overall coating, but some precautions must be taken. For example, there is a small annular area around each hole which is not coated, the purpose being to avoid grounding the flanges (78 in FIGS. 2 and 3) of the eyelet contacts or bushings. This is shown in FIG. 19 in which one of the numerous pin receiving holes of FIG. 18 is shown to greatly enlarged scale at 184. The metal deposit stops short of hole 184, leaving an uncoated annular area 188 which is wider than the width of the flange.

It is believed that the construction, method of assembly, and method of use of our improved multilayer circuitry will be apparent from the foregoing detailed description. Once the plan for the wiring has been set up the wiring is easy to do even by a relatively unskilled worker. The bushings are inserted each in its appropriate hole with the help of the alpha-numeric code permanently printed on the board. After the boards have been completed and stacked, the pins are inserted with the help of the alpha-numeric code, each in its appropriate hole. The only choice that need be made in respect to the pins is that either a full length pin or a shortened pin is employed, again in accordance with the prescribed plan given to the worker.

The multilayer circuitry has been shown applied to a computer rack, but it is useful for other purposes, and particularly where there is a large array of numerous closely spaced terminals to be interconnected. It will also be understood that while we have shown the use of six matrix boards, a greater or lesser number of boards may be employed, depending upon the complexity of the circuitry to be produced. The same boards may be used in multiple, that is, two sets of six may be superposed, making twelve boards in all, or three sets of six making eighteen boards in all, thus greatly increasing the number of combinations of connections obtainable. In such case the pins would be about double or triple the length here shown. Extra boards may be provided which are not in sets, that is, there may be more of some kinds than others, as may be found desirable when planning the needed winding.

The use of overall shielding on the backs of the boards is optional. The grid shielding on the face of the board is more likely to be needed, but in some cases may not be necessary. The printed circuit lines may be on the top or on the bottom of the boards. Without back shielding the boards need not be spaced apart.

It will therefore be apparent that while we have shown and described the invention in several preferred forms, changes may be made without departing from the scope of the invention, as sought to be defined in the following claims. In the claims the mention of "superposed" matrix boards refers to the temporary position shown in FIG. 1 when the circuitry is being completed by the insertion of the pins, even though in practice the entire assembly later is used in upright position. The term "mother board" is used primarily to distinguish it from the term "matrix board." The term "mother board" refers to printed circuit boards or socalled "cards" detachably received in the edgeboard connectors. The term "matrix board" applies to specially printed multilayer boards, as well as to horizontal, vertical and diagonal grids. The term "matrix board" is used to differentiate them from the removable boards.

We claim:

1. Multilayer circuitry comprising a plurality of superposed matrix boards, each board having printed wiring on one face, means holding said boards in superposed relation, said boards having aligned holes, a plurality of metal contact bushings secured in said holes, said bushings having spring tongues projecting inwardly and being connected to a printed circuit line on the printed face of the board, said tongues being spaced from both the top and the bottom ends of the bushings, and metal pins of uniform diameter in said aligned holes for connections to and between aligned bushings, the side wall of an eyelet being open to permit circumferential yielding in the hole receiving the same, and said eyelet being shorter in axial length than the thickness of the board, whereby the boards may be superposed without spacers therebetween.

2. Multilayer circuitry comprising three or more superposed matrix boards, each board having printed wiring on one face, means holding said boards in superposed relation, said boards having aligned holes, metal contact bushings secured in those holes where contact is to be made externally of the board, said bushings having spring tongues projecting inwardly and being connected to a printed circuit line on the printed face of the board, said tongues being spaced from both the top and the bottom ends of the bushings, and metal pins of uniform diameter in said aligned holes for connections to and between aligned bushings, at least one aligned set of three or more holes having two bushings and a pin for connection therebetween, but there being no metal bushing at the said pin in a third board where no connection is wanted, the side wall of an eyelet being open to permit circumferential yielding in the hole receiving the same, said eyelet being shorter in axial length than the thickness of the board whereby boards may be superposed without spacers therebetween.

References Cited by the Examiner

UNITED STATES PATENTS

| 249,574 | 11/81 | Blake | 339—18 |
|---|---|---|---|
| 840,537 | 1/07 | Weir | 339—18 X |
| 2,594,069 | 4/52 | Poehlmann | 339—18 |
| 2,967,285 | 1/61 | Freitas | 339—18 |
| 3,179,913 | 4/65 | Mittler et al. | 339—19 |

FOREIGN PATENTS 617,539  2/49  Great Britain.

JOSEPH D. SEERS, *Primary Examiner.*

PATRICK A. CLIFFORD, *Examiner.*